C. C. MANKER.
INTERNAL COMBUSTION ENGINE.
APPLICATION FILED JULY 19, 1918.

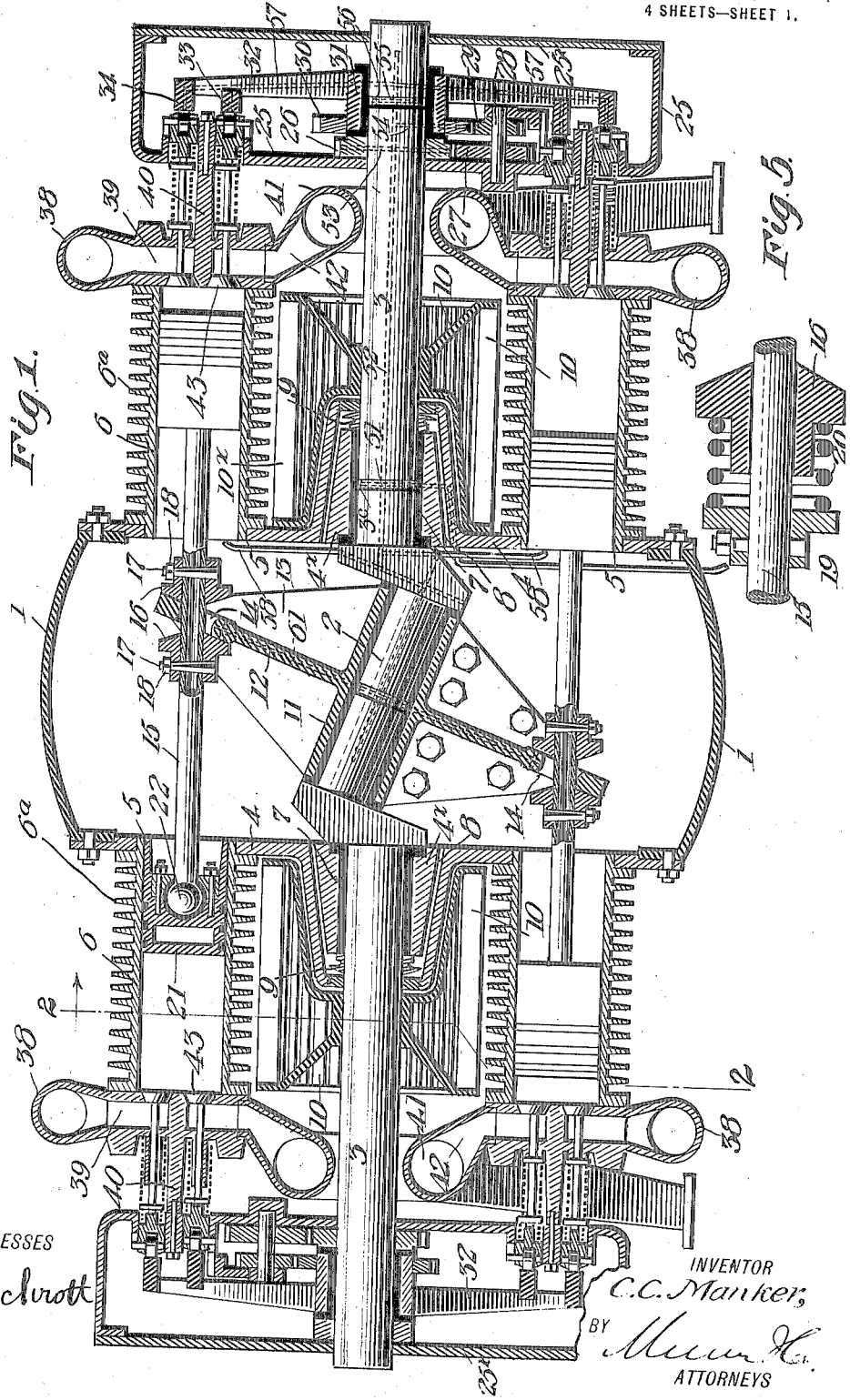

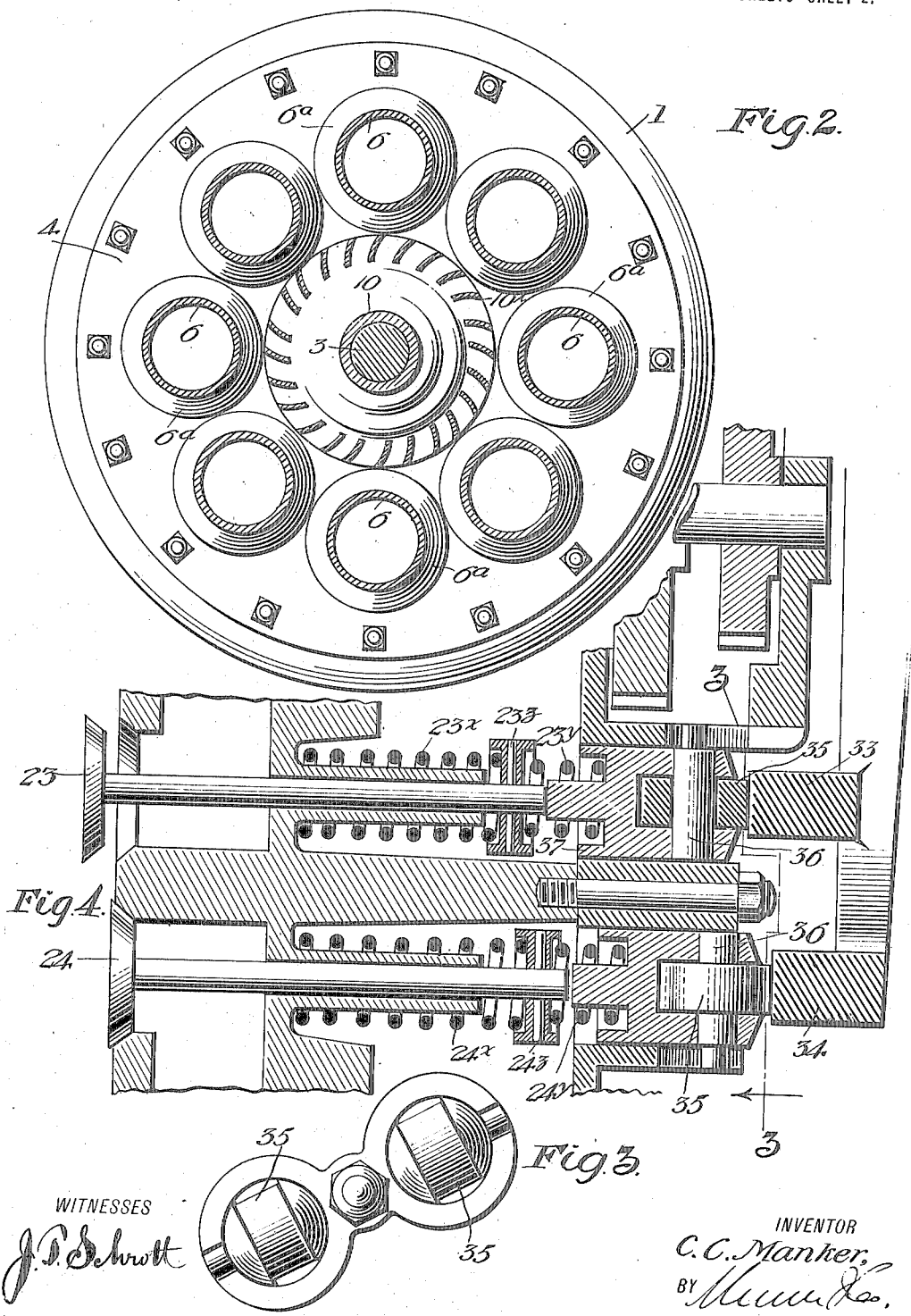

1,345,614.

Patented July 6, 1920.
4 SHEETS—SHEET 3.

WITNESSES
R. E. Rousseau

INVENTOR
C. C. Manker,
BY
ATTORNEYS

C. C. MANKER.
INTERNAL COMBUSTION ENGINE.
APPLICATION FILED JULY 18, 1918.
1,345,614.
Patented July 6, 1920.
4 SHEETS—SHEET 4.
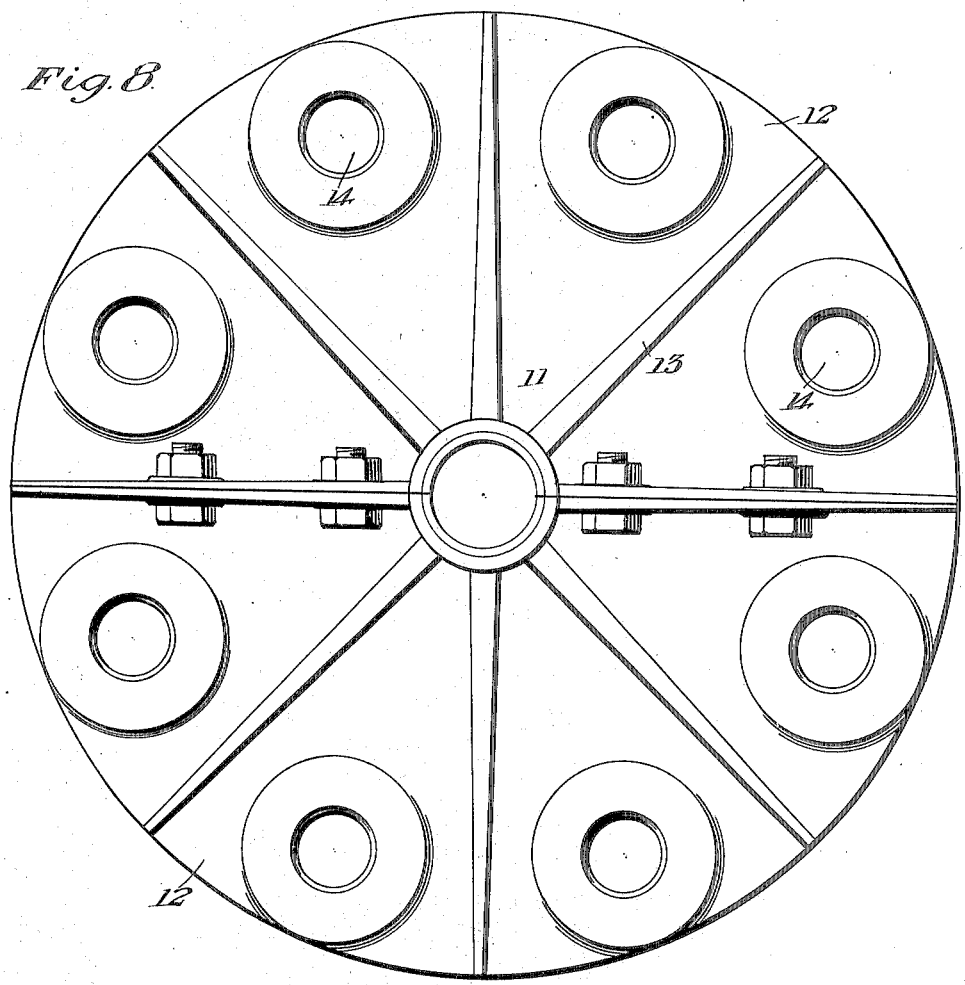
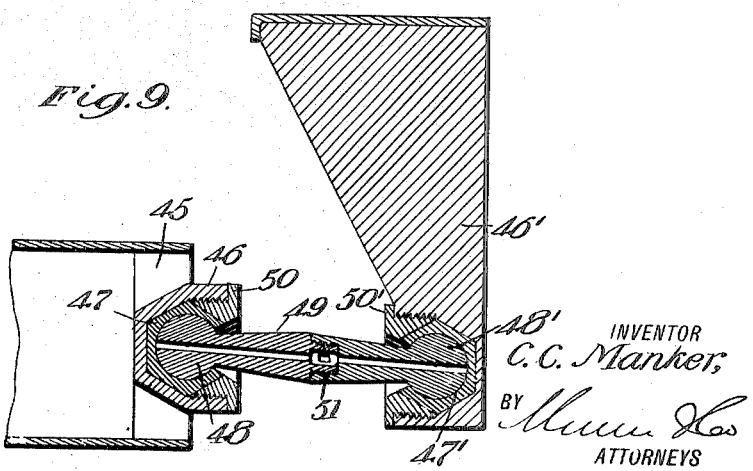

UNITED STATES PATENT OFFICE.

CHARLES CAREY MANKER, OF DES MOINES, IOWA, ASSIGNOR OF ONE-HALF TO J. B. FAYANT, OF GOLCONDA, NEVADA.

INTERNAL-COMBUSTION ENGINE.

1,345,614.　　　　　Specification of Letters Patent.　　　Patented July 6, 1920.

Application filed July 18, 1918. Serial No. 245,544.

*To all whom it may concern:*

Be it known that I, CHARLES C. MANKER, a citizen of the United States, and a resident of Des Moines, in the county of Polk and State of Iowa, have made certain new and useful Improvements in Internal-Combustion Engines, of which the following is a specification.

My invention relates to improvements in internal combustion engines, and it consists in the combinations, constructions and arrangements herein described and claimed.

An object of my invention is to provide a multi-cylinder engine of a relatively light weight, *i. e.*, light in weight compared with the amount of power generated.

A further object of my invention is to provide an internal combustion engine having a "wabbler" with opposed pistons on each side thereof, said opposed pistons being connected by straight piston rods which are operatively connected with the wabbler, thus obviating all tendency to side thrusts.

A further object of my invention is to provide an internal combustion engine having a pair of opposed groups of cylinders operatively connected with a central wabbler and having novel means for positively drawing in air around the cylinders to cool them.

A further object of my invention is to provide a novel arrangement for positively operating the valves of the various cylinders.

Other objects and advantages will appear in the following specification and the novel features of the invention will be pointed out in the appended claims.

My invention is illustrated in the accompanying drawings, forming part of this application in which—

Figure 1 is a central longitudinal section through the device.

Fig. 2 is a section on the line 2—2 of Fig. 1.

Fig. 3 is a section along the line 3—3 of Fig. 4.

Fig. 4 is an enlarged sectional view of a portion of the valve operating mechanism.

Fig. 5 is a detailed sectional view of a modified means for connecting the wabbler to the piston rods.

Fig. 8 is a face view of the wabbler, and

Fig. 9 is a sectional view showing a modified form of connection between the piston rods and the wabbler.

Figure 6:
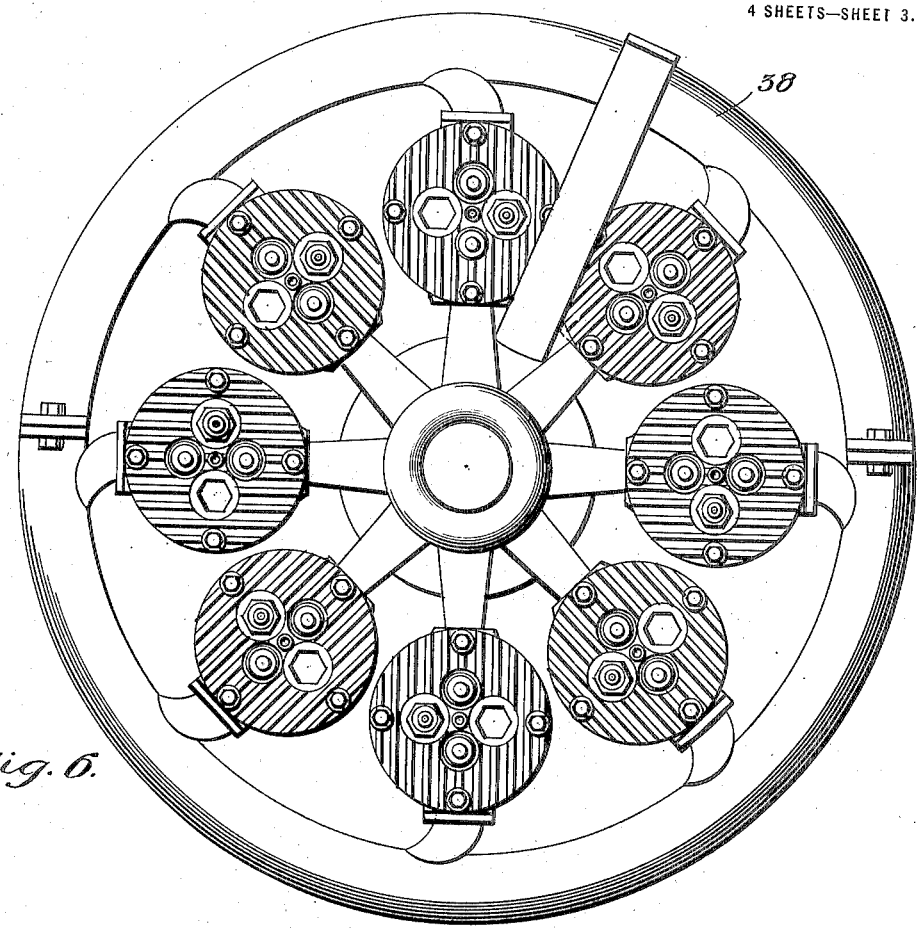
Fig. 6 is an end view, the valve operating mechanism and the housing therefor being removed.
Figure 7:
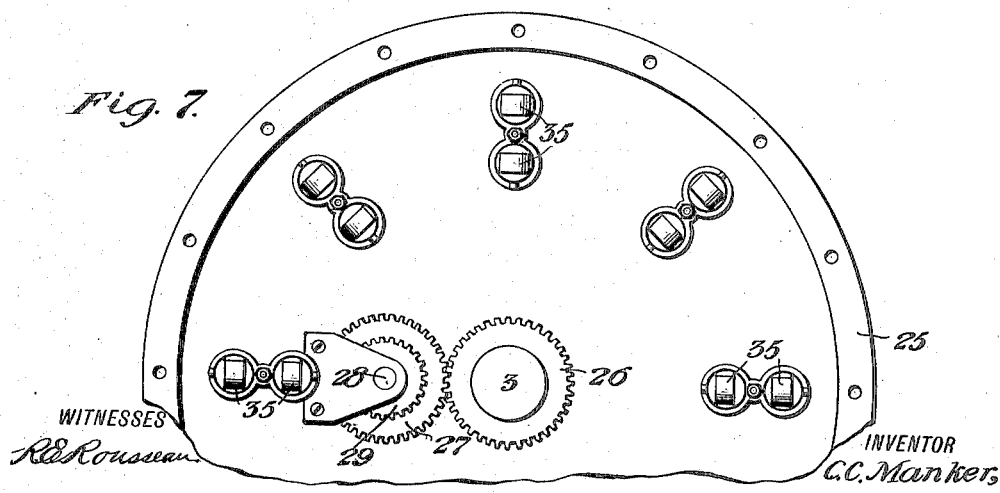
Fig. 7 is an end view of the valve operating rollers of a portion of the device.

Referring particularly to Fig. 1, it will be seen that I have provided a circular casing 1 which forms a housing for the central portion 2 of the crank shaft 3. This casing is provided with heads 4 which are bolted or otherwise secured to the main body portion and which are provided with openings 5 disposed in circular arrangement around the crank shaft 3. Cylinders 6 have their ends machined so as to fit tightly in the openings. The heads 4 have central extensions $4^x$ which are bored to admit the bearing linings 7. Oil ducts 8 are cast in the bearing so that any overflow of oil from the end of the bearing will flow back into the crank case. A collar 9 is attached to the shaft 3 at the outer end of each bearing and serves to throw oil to the lower part of the housing so that it may not follow the shaft. Both of the frame heads are identical in construction and in the present instance eight cylinders are shown as secured to each head.

The cylinders 6 are cast with fins $6^a$ on their external walls, these fins being for the purpose of accelerating the heat radiation. These cylinders are of the "valve in head" type. Secured to the shafts 3 in the space between the cylinders are fans 10 which are composed of spider frames bearing curved blades $10^x$. As will be seen from the drawings one end of the spider frame surrounds the main bearing so as to prevent leakage. These fans operate on the centrifugal principle and the blades are curved so that when the shaft is rotated the air enters at the end of the motor and passes over the cylinder heads before entering the fan. The air is then propelled from the fan and passes over and between the fins on the cylinder walls cooling the same effectively.

The central portion 2 of the crank shaft, has mounted thereon the hub 11 of the wabbler disk 12. The latter is suitably braced by means of fins 13 as shown in the drawings. The outer edge of the disk 12 is provided with a series of openings 14 having rounded edges to admit the piston rods 15. The disk 12 is operatively connected with the piston rods 15 by means of thrust cones 16 mounted on the piston rods and secured thereto by any suitable means such as by taper pins 17, and bolts 18 as shown in Fig. 1, or by thrust disks 19 secured to the shafts 15 and having springs 20 arranged to engage the thrust cones 16 to hold them in operative relation with the disk 12 and to take up any wear either in the cone or the disk. The cone thrust 16 is so shaped that the surfaces always make a perfect bearing.

As will be seen from the drawings the piston rods 15 are secured to the piston 21 by means of a ball and socket connection 22. This permits a rotary movement of the piston rod and also of the thrust cone during the wabbling action of the disk 12, the combined sliding and rolling action tending to present new surfaces constantly to the disk so that the friction and wear are very slight.

In Fig. 4 I have shown the valve construction. Each of the valves 23 and 24 is provided with a spring $23^x$ and $24^x$ respectively, which bear on collars $23^z$ and $24^z$ on the valve stem and tends to keep the valve seated. Other springs $23^y$ and $24^y$ are also provided for the purpose explained later.

The mechanism for operating the valve is carried in a housing 25. It consists of a gear 26 secured to the shaft 3 and arranged to engage a gear 27 on a shaft 28, bearing a gear 29 in mesh with the gear 30 on the hub 31 of the cam wheel 32. The latter is provided with laterally extending circular cam members 33 and 34 respectively, which are arranged to engage rollers 35 mounted on shafts 36 carried by slidable push rods 37. The cam members 33 and 34 are arranged so that when the cam wheel 32 is rotated the valves of the various cylinders are operated in succession. In the present arrangement the cylinders 1, 3, 5 and 7 are fired in the order named and at this time the other cylinders are exhausting or taking in fresh charges to be compressed.

The exhaust manifolds 38 are annular in shape and are connected with the exhaust valves by passages 39 which are cast in the heads of the cylinders. The latter as will be observed are all provided with an arm or support 40 to which the casing 25 is secured. The intake manifold 41 is connected with the intake valves by means of inclined passages 42 which tend to reduce the friction of the incoming gases and to space the manifold from fan to permit free entrance of air thereto. The inlet manifold as well as the exhaust manifold may be made in two parts and bolted together.

From the foregoing description of the various parts of the device the operation thereof may be readily understood.

The engine is designed to be started by the use of any form of standard starting device. The carbureted mixture enters the intake manifold 41 and passes into the cylinder whose intake valve 43 is opened to permit the entrance of the charge into the cylinder. The mixture is compressed on the return stroke of the piston and is fired by a spark plug, not shown, in the ordinary manner. The forward movement of the piston causes the piston rod 15 to force the cone thrust members 16 against the face of the wabbler disk 12. The latter is mounted in such position that the force thus exerted creates a turning moment. As the other cylinders are fired successively these turning moments cause the rotation of the shaft 3.

It will be noted that the piston rods of opposed pistons are in alinement so that when one piston is moving outwardly on its firing stroke, the piston on the opposite side may be forcibly moved to compress the charge by a straight thrust of the first piston.

As stated before, the wabbler disk moves so as to be tangent to the surface of the thrust cones 16 on opposite sides of the disk. Since the piston rod 15 passes through the opening 14, and the wabbler disk merely oscillates from one side to the other with respect to the piston rod, the gain in the force transmitted and which is utilized both in causing the wabbler disk to revolve and also in compressing the charge in the opposite cylinder is considerably more than in those constructions in which the piston rods on opposite sides of the wabbler are not in alinement during the firing stroke of the cylinder.

As the shaft 3 revolves the fan 10 by its centrifugal action draws in air between the ends of the cylinders and the casing 25. This air passes through the fan and then is forced positively over and past the cylinders, whose heat radiating vanes $6^a$ are rapidly cooled thus insuring the efficient cooling of the engine. It will be noted that the movement of the air from the fan is outwardly in a radial direction so that none of the heated air which is blown away from any one cylinder has to pass over any other portion of the engine. Furthermore, the fact that this heated air is passing radially from all the cylinders simultaneously further adds to the efficiency of the cooling system.

As the shaft 3 revolves it carries around with it the cam wheel 32 whose cam members 33 and 34 operate the valves in the manner described. As stated before, however, the movement of the cam wheel is effected not by mounting it rigidly on the shaft 3, but by providing a double reduction gearing consisting of the members 26 to 30 inclusive which cause the cam wheel to rotate around the shaft at half the speed of the latter. The cam tracks 33 and 34 engage the rollers 35 which are held in engagement with the tracks by means of the springs 23ʸ and 24ʸ, see Fig. 4. This insures the proper operation of the valves and also reduces the noise.

Instead of using the connections shown in Figs. 1 and 5 for transmitting the power from the pistons to the wabbler, I may use that form shown in Fig. 9, in which the piston 45 is provided with a threaded socket 46 arranged to receive hexagonal lining portions 47 having spherical recesses for receiving the spherical end 48 of a connecting rod 49. A screw plug 50 is provided for holding the lining 47 in position, the two parts of the connecting rod being screwed together by a male and female connection 51. The opposite end of the connecting rod is provided with a ball and socket device consisting of the members 47′, 48′ and 50′ which correspond to the parts 47, 48 and 50, the hexagonal linings 47′ being formed in the wabbler member 46′, a portion of which (one quarter) is shown in Fig. 9.

An engine such as that described above has numerous advantages. In the first place it can be built very light in comparison with the power developed, thus rendering it especially adaptable to automobiles, aeroplanes and the like. As has been before stated the air cooling arrangement insures efficient cooling, and the operation of the valves by the cam wheels insures the proper timing of the valves. I wish to call attention to a feature which renders the inspection of the valve operating mechanism very simple. By removing the end cover 25ˣ of the casing 25, access is had to the valve operating mechanism. The cam wheel 32 may be removed and this gives access to the reduction gearing. Any cylinder head can be removed independently of the others by first removing the exhaust manifold. This is accomplished by removing the bolts which hold the halves together and then taking out the bolts which hold the head in place. The head can then be pulled straight out and the cylinder bore exposed for inspection.

In addition to the parts described, I have indicated the preferred means for lubricating the engine. This comprises a pipe 50, leading from an oil reservoir which is under pressure. The pipe passes through the crank casing 1, and into the bearing 4 and communicates with an oil channel 3ᶜ in the shaft 3. This is provided with ducts 51 leading to a central channel 52 in the shaft. Branches 53, 54 and 55 extend from the channel 52 as shown in the drawing. The branch 55 communicates with an oil channel 56 which in turn communicates with the oil branches 57 leading to the cam members 33 and 34, by means of which the rollers at the ends of the push rods are lubricated. The channel 52 communicates with pipes 58, the ends of which are disposed in such position that when the shaft is rotated, the oil is thrown out by centrifugal force in addition to the normal pressure in the interior of the cylinders. The channel 59 in the central portion of the crank shaft communicates with an oil groove 60 which in turn communicates with the oil duct 61 disposed in the wabbler plate 12, and which leads to the cone thrust members 16 for lubricating the latter.

The oil under pressure flows to the various parts and the rotation of the shaft causes the lubrication of the cylinders, as described.

I claim;—

1. In an internal combustion engine, a crank shaft, a wabbler mounted on said crank shaft, a series of cylinders disposed parallel to said crank shaft, each of said cylinders having a piston rod arranged to pass through a portion of said wabbler and thrust cones carried by said piston rod on each side of the wabbler for transmitting the movement of the piston to the wabbler.

2. In an internal combustion engine, a crank shaft, a wabbler mounted on said crank shaft and having an outstanding apertured disk, a series of cylinders disposed parallel to said crank shaft, each of said cylinders having a piston rod arranged to pass through one of the apertures of said wabbler, and thrust means carried by each piston rod at opposite sides of the wabbler disk for transmitting the movement of the piston rods to said wabbler.

3. In an internal combustion engine, a crank shaft having a central portion disposed at an angle with the major portion of the shaft, a wabbler mounted on said angular portion, said wabbler comprising a hub, a radially extending plate secured to said hub, lateral braces joining said hub and said plate, said plate having a series of openings near its outer edge, the inner edges of the openings being rounded, piston rods extending through the openings, and wabbler engaging means carried by each piston rod at opposite sides of the wabbler plate.

4. In an internal combustion engine, a crank shaft having a central portion disposed at an angle with the major portion of the shaft, a wabbler mounted on said angular portion, said wabbler comprising a hub, a radially extending plate secured to said hub, lateral braces joining said hub and said plate, said plate having a series of openings near its outer edge, the inner edges of the openings being rounded, a series of opposed pistons, piston rods for said opposed pistons arranged to pass through the openings in said wabbler plate, and thrust elements carried by the piston rods at opposite sides of the wabbler plate for transmitting the movement of the rods to the plate.

CHARLES CAREY MANKER.